(12) United States Patent
Spitz et al.

(10) Patent No.: US 6,538,910 B1
(45) Date of Patent: Mar. 25, 2003

(54) RECTIFIER SYSTEM, PREFERABLY FOR A THREE-PHASE GENERATOR FOR MOTOR VEHICLES

(75) Inventors: Richard Spitz, Reutlingen (DE); Doerte Eimers-Klose, Reutlingen (DE); Hans-Reiner Krauss, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,406

(22) PCT Filed: Feb. 23, 2000

(86) PCT No.: PCT/DE00/00499

§ 371 (c)(1),
(2), (4) Date: May 14, 2002

(87) PCT Pub. No.: WO00/52814

PCT Pub. Date: Sep. 8, 2000

(30) Foreign Application Priority Data

Feb. 26, 1999 (DE) .......................... 199 08 697

(51) Int. Cl.$^7$ .................................................. H02M 7/06
(52) U.S. Cl. ....................................................... 363/126
(58) Field of Search ............................ 363/52, 53, 88, 363/126, 125

(56) References Cited

U.S. PATENT DOCUMENTS 3,087,106 A * 4/1963 Baude et al. ............... 363/126
3,739,209 A   6/1973 Drabik
4,866,344 A   9/1989 Ross et al.
5,200,887 A   4/1993 Ioroi et al.

FOREIGN PATENT DOCUMENTS

| DE | 42 25 359 | 3/1994 |
| EP | 0 372 820 | 6/1990 |
| WO | WO 87 00 490 | 1/1987 |

* cited by examiner

Primary Examiner—Shawn Riley
(74) Attorney, Agent, or Firm—Kenyon & Kenyon

(57) ABSTRACT

A three-phase bridge rectifier system is proposed, having three rectifier paths, in which two rectifier elements at a time are in series, each rectifier path between the rectifier elements being connectible to one of three leads of a three-phase current terminal; the three cathode terminals of the rectifier elements lying opposite the three-phase current connection are connected to an positive pole, and the three anode terminals of the rectifier elements lying opposite the three-phase current connection are connected to a negative pole; at least three of the rectifier elements being formed by two-pole semiconductor rectifiers having at least two series-connected p–n junctions. The system is used for making available a volt motor vehicle electrical system having assured reliable voltage limitation.

4 Claims, 5 Drawing Sheets

RECTIFIER SYSTEM, PREFERABLY FOR A THREE-PHASE GENERATOR FOR MOTOR VEHICLES

BACKGROUND INFORMATION

The present invention starts from a three-phase bridge rectifier system according to the definition of the species of the main claim. From German DE 42 25 359 C1, three-phase bridge rectifier systems are known having two semiconductor diodes per phase, in which the voltage-stabilizing properties of individual Zener-diodes are used. In this kind of voltage stabilization, however, when the rectifier system is to be designed for higher motor vehicle electrical system voltages, such as 42 volts, the manufacturing tolerance of the breakdown voltage of the Zener-diodes is too great to achieve a reliable voltage limitation at a given minimum ripple to be passed.

SUMMARY OF THE INVENTION the three-phase bridge rectifier system, according to the present invention, having the characterizing features of the independent claim, on the other hand, has the advantage, compared to this, of being able to achieve reliable voltage stabilization even for high motor vehicle electrical system voltages, through the use of the bridge rectifier system itself, in particular, for example, a voltage limitation is reliably achieved in the case of an operating voltage at B+ of 42 volt and a maximum ripple at B+ of 47 volt, as soon as the voltage at B+ has reached a value of 55 volt.

As a result of the measures specified in the dependent claims, advantageous further refinements and improvements of the rectifier indicated in the main claim are possible.

FIELD OF THE INVENTION

The present invention relates to a three-phase bridge rectifier system.

BACKGROUND INFORMATION

German Patent No. 42 25 359 describes three-phase bridge rectifier systems having two semiconductor diodes per phase, in which the voltage-stabilizing properties of individual Zener-diodes are used. In this kind of voltage stabilization, however, when the rectifier system is to be designed for higher motor vehicle electrical system voltages, such as 42 volts, the manufacturing tolerance of the breakdown voltage of the Zener-diodes is too great to achieve a reliable voltage limitation at a given minimum ripple to be passed.

SUMMARY OF THE INVENTION

The three-phase bridge rectifier system, according to the present invention on the other hand, has the advantage, compared to this, of being able to achieve reliable voltage stabilization even for high motor vehicle electrical system voltages, through the use of the bridge rectifier system itself, in particular, for example, a voltage limitation is reliably achieved in the case of an operating voltage at B+ of 42 volt and a maximum ripple at B+ of 47 volt, as soon as the voltage at B+ has reached a value of 55 volt.

Especially by providing Zener-diode pairs does it become possible to produce high clamp voltages with narrow tolerance ranges.

It is also particularly advantageous to make available high clamp voltages by the integration of at least two p-n junctions in a single semiconductor element in the form of three-layer or four-layer diodes. In particular, the problem of the instability of the breakdown as a result of excessive warming because of the high load-dump current and the positive temperature response of the breakdown voltage is eliminated, since the voltage drops off, shortly after the breakdown, to a low value which is then only still required to leave the three-layer or four-layer element in the patched through condition.

DETAILED DESCRIPTION

Figure 1:
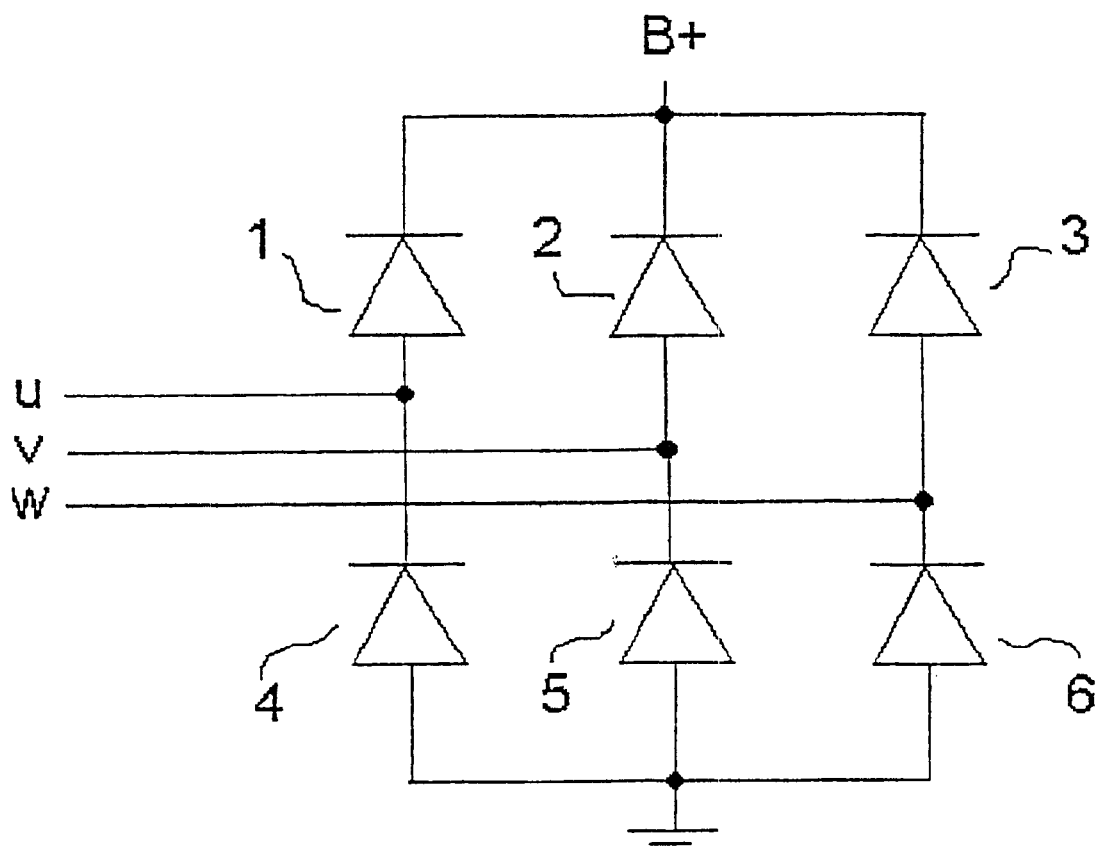
FIG. 1 shows a rectifier system known per se.

FIG. 1 shows a three-phase bridge rectifier system known per se. The three terminals u, v and w of a three-phase current generator are each connected to one diode pair (1, 4), (2, 5) or (3, 6), respectively, the terminals being designed as center tap of the series-connected diodes in each case. The anodes of diodes 4, 5 and 6 are connected to ground, the cathodes of the diodes 1, 2 and 3 to positive pole B+ of the rectifier system.

If there is a three-phase current at terminals u, v and w, this is transformed into a direct current, by shunting the positive half-waves of the three phases to the positive pole, and the negative half-waves to the ground terminal; the respective opposite rectifier diodes are then poled in back direction to this. Voltage supplies for motor vehicle electrical systems having an operating voltage at B+ of 14 or 28 volt can be made available in this manner using known semiconductor diodes.

Figure 2:
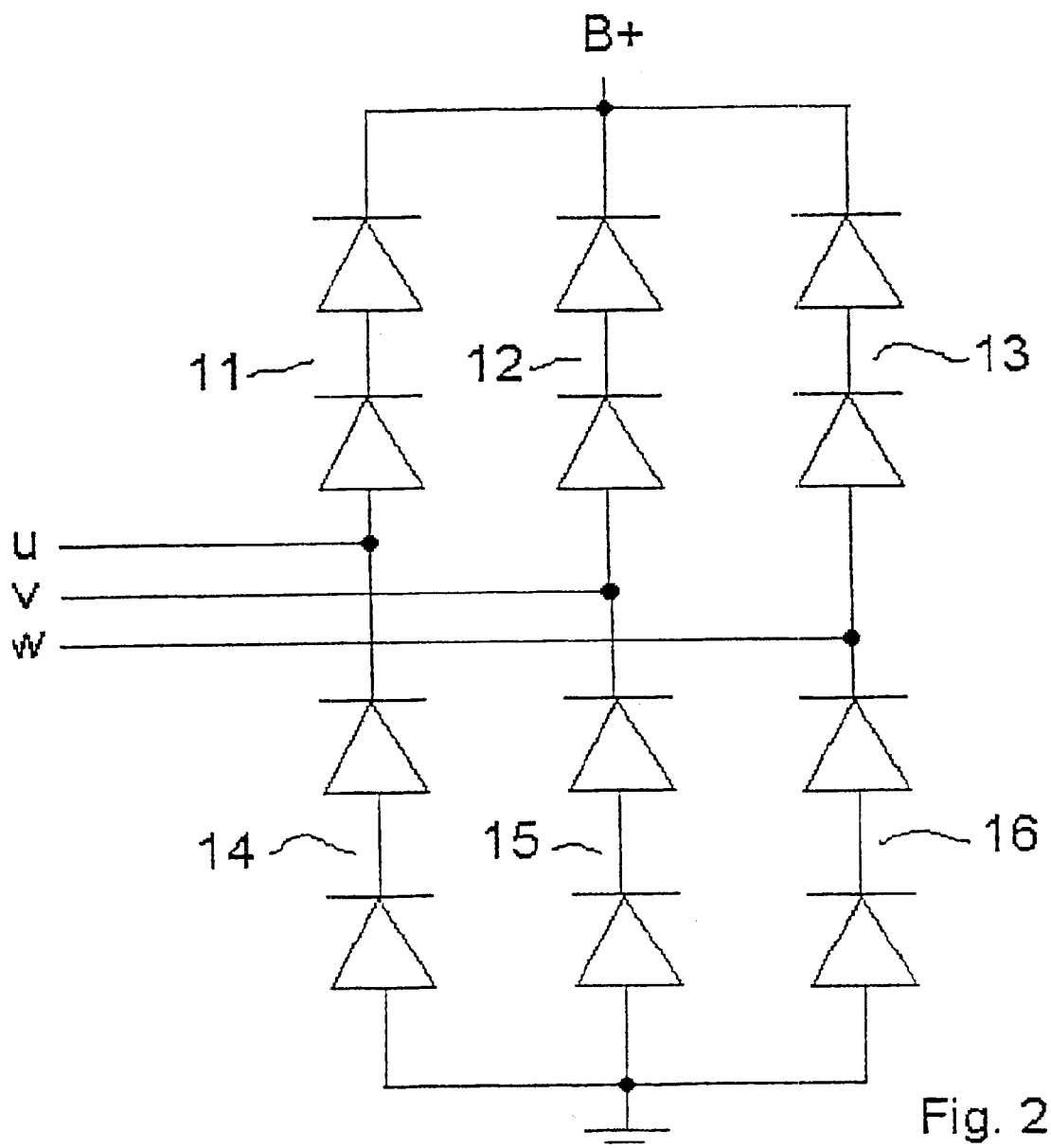
FIG. 2 shows a first exemplary embodiment.

FIG. 2 shows a first exemplary embodiment according to the present invention, in which, in comparison to FIG. 1, the single diodes 1 through 6 are substituted by pairs 11, 12, 13, 14, 15 and 16 of diodes connected in series, that is, the diode pairs represent circuit elements having two p–n junctions connected in series.

Using this system, voltage supplies for motor vehicle electrical systems having an operating voltage at B+ of 42 volt can be made a reality. The rectifier system permits a ripple of 47 volt at B+ (conditional upon the spool system of the three-phase current generator) and simultaneously limits the voltage at B+ to a maximum of 55 volt. For this, for example, at least the diodes of the pairs 14, 15 and 16 are made as Zener-diodes, so that between each combination of two of the three three-phase phases at least one current path having two Zener-diode pairs connected antiserially is arranged. This assures in each phase position of the three-phase current that, with correspondingly set breakdown voltage of the individual Zener-diodes, the operating voltage at B+ does not exceed a value of 55 volt, while, when needed, the Zener-diode pair in question "breaks down", that is, it shorts out the two three-phase current phases in question. When using individual Zener-diodes instead of Zener-diode pairs, this can be done only with difficulty if, for example, the Zener-diodes are still supposed to conduct on to B+ a maximum ripple at B+ of at least 47 volt, but at the same time the predefined limit for voltage limitation lies relatively close to 47 volt (such as the 55 volt mentioned above). The manufacturing tolerance for breakdown voltages in Zener-diodes is typically 6 volt, thus covering a range such as 47 to 53 volt. The actual breakdown, however, takes place at higher voltages, since the internal resistance in the blocking direction in a Zener-diode of such a high breakdown voltage is correspondingly high and causes an additional voltage drop which has to be applied at the initiation of the Zener-diode breakdown. Besides that, especially in motor vehicles, over longer periods large currents flow through the diodes which heat the Zener-diodes. Because of that, in turn, the internal resistance of the Zener-diodes, which is high per se, increases in the blocking direction, and furthermore, even the breakdown voltage in avalanche diodes has a positive response to temperature changes, whereby the voltage required for breakdown is increased again. Finally, at breakdown itself, that is, in the case of load dump, large currents flow which can increase the breakdown voltage on account of the mentioned positive response to temperature changes, so that the breakdown voltage has a further increase. The design according to the present invention, on the other hand, avoids these difficulties in that the breakdown voltages are produced as the sum of two breakdown voltages half the size by the Zener-diodes of a Zener-diode pair 14, 15 or 16, respectively, connected in series. The single diodes, for example, have an average breakdown voltage of 24.5 volt, at a likewise halved tolerance of +/−1.5 volt. The resulting breakdown voltage of the diode pair then lies in a range of 47 to 51 volt, thus having a tolerance range of √2×3 volt, or approximately 4 volt. That represents a tolerance range reduced by 2 volt compared to a single diode, which would by itself even make available the required breakdown voltage. Beyond that, the large current flowing in the blocking direction at load dump will generate only half the power loss in each diode of the diode pair in question, with the temperature of the p–n junction being clearly lower. Because of the halved breakdown voltage, the internal resistance of the diode is also reduced. As a result, the requirement of 55 volt as maximum voltage can thus be fulfilled in a simple manner. In a modified specific embodiment the diode pairs 11, 12 and 13 are substituted by high-blocking capability single diodes having a breakdown voltage of, for instance, more than 60 volt. The voltage limitation is further guaranteed by the Zener-diode pairs 14, 15 and 16. In a further specific embodiment, diode pairs 11, 12 and 13 are designed, just as the diode pairs 14, 15 and 16, as Zener-diode pairs having a corresponding breakdown voltage In this case, between each combination of two of the three three-phase current phases, lie two current paths, each having two antiserially connected Zener-diode pairs, so that during an overvoltage between two phases of the three-phase current two breakdown paths can be opened, whereby the current per diode is reduced and thus the temperature influence on the breakdown voltage is again reduced.

Figure 3:
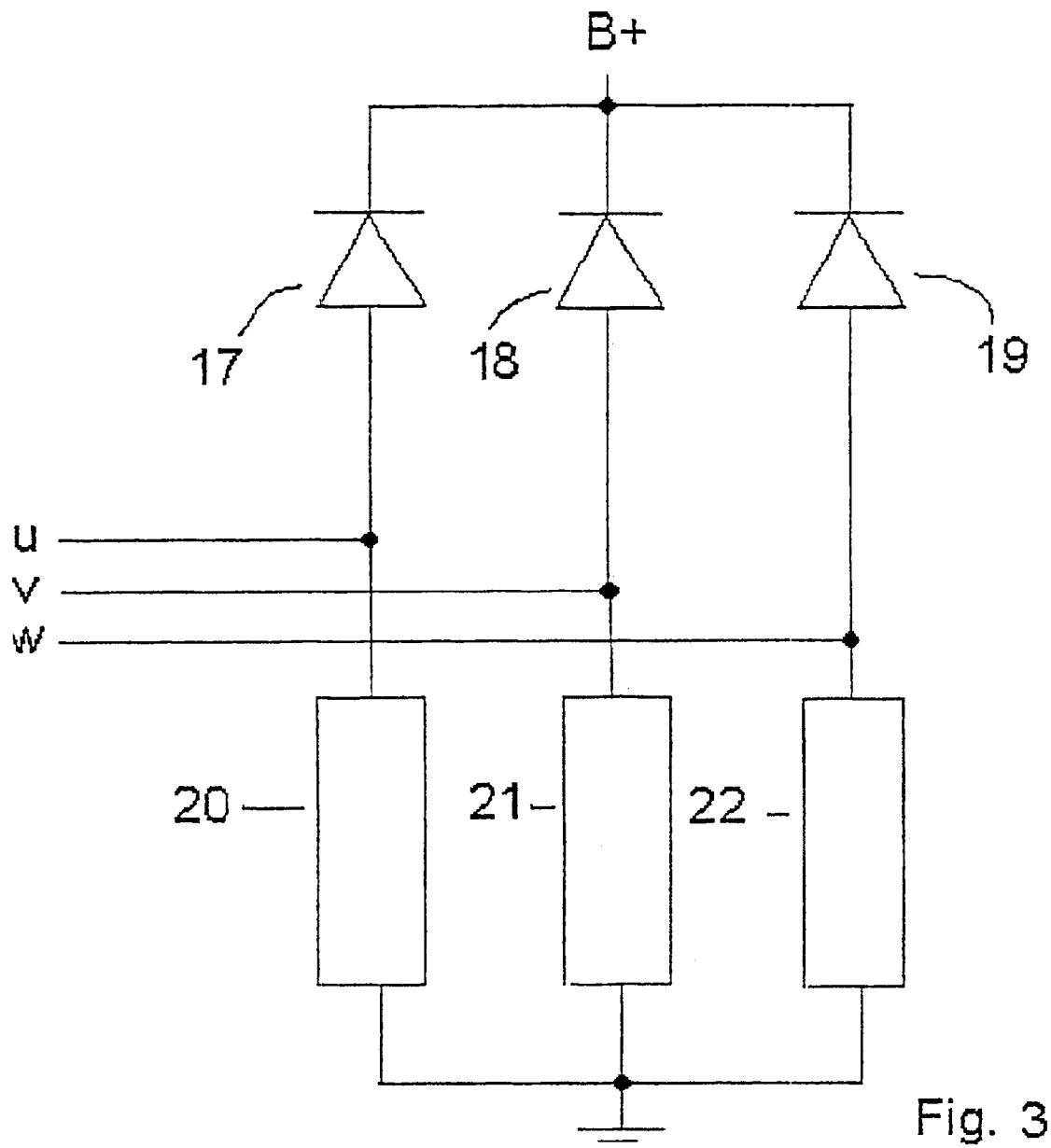
FIG. 3 shows a second exemplary embodiment.

FIG. 3 shows a further exemplary embodiment according to the present invention, in which, compared to FIG. 1, the single diodes 1 to 3 are designed as high-blocking capability diodes 17, 18 and 19 having a breakdown voltage greater than 55 volt, and the single diodes 4 to 6 have been substituted by semiconductor rectifier elements 20, 21 and 22. Rectifier elements 20, 21 and 22 are each formed by a four-layer diode with cathode short circuit, the anode of each four-layer diode being connected to the ground terminal. A four-layer diode, as is well known, is formed by a p–np–n semiconductor sequence of coatings with cathode short circuit, and represents a series connection of three p–n junctions. Connected antiparallel to each four-layer diode between the ground terminal and the phase terminal u, v or w, respectively, there is a high-blocking capability diode of the type of diodes on the anode side B+ of the rectifier system.

Figure 4:
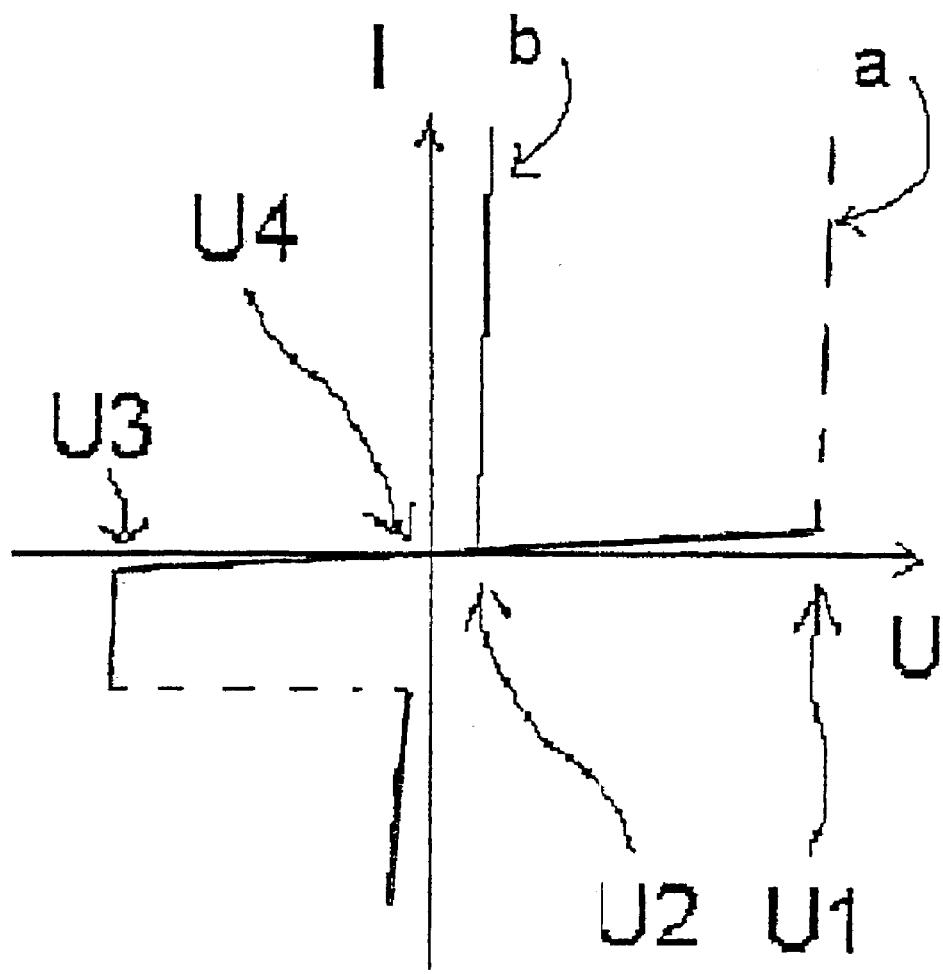
FIG. 4 shows a current-voltage diagram.

As clarification of the method of functioning of the system according to FIG. 3, FIG. 4 shows a current-voltage diagram (I–U diagram) a of a four-layer diode, and a current-voltage diagram b of a rectifier element 20, 21 or 22, respectively. In the pass direction, the four-layer diode connects through only at a voltage U1 (for example, 50 volt), and therefore a high-blocking capability diode is connected in parallel to the four-layer diode in the rectifier element, in order to guarantee pass through the rectifier element at pass polarity (negative voltage at the cathode of the four-layer element), as with a normal two-layer diode having only one p–n junction (curve b, conducting-state voltage U2). On the other hand, with polarity in the blocking direction, the current increases greatly through the four-layer diode or the rectifier element beginning from a peak off-state breakover voltage U3 (for example, −50 volt), the four-layer diode breaks down and the voltage decreases to a very small value U4 (for example, −1 to −2 volt) at maintained patched through condition in the blocking direction.

The magnitude of the current at this breakover of the voltage is the so-called breakover current. The value of the breakover voltage U3 and of the breakover current can be chosen by corresponding dimensioning of the four-layer diode. Thus the requirement for limiting the voltage to 55 volt can be easily fulfilled using the rectifier elements according to the present invention, positioned in the rectifier. As opposed to a system as in FIG. 2, only 9 semiconductor diode chips are needed instead of 12, and thus only 3 more instead of 6 more than in the known system as in FIG. 1 for low-voltage vehicle electrical systems. Whereas in the solution as in FIG. 2 the power loss in the flow direction of the diodes is doubled by the double number of diodes as compared to the known system as in FIG. 1, the power loss is lower on account of a smaller number of diode chips. In addition, in the functioning of the rectifier it is of advantage that, at breakdown of the rectifier elements the voltage becomes sharply lower, consequently less additional power loss occurs, and thereby the breakdown voltage can be determined more accurately.

In a modified specific embodiment, rectifier elements 20, 21 and 22 can be exchanged with the high-blocking capability diodes 17, 18 and 19. With this modified system too, for each combination of two of the three three-phase current phases, at least one breakdown current path is guaranteed, given by two antiserially connected rectifier elements. In another modified specific embodiment of FIG. 3, rectifier elements 20, 21 and 22, instead of by parallel connections of four-layer diodes (thyristor diodes) are formed by three-layer diodes ("transistor diodes") with high-blocking capability diodes. Thus, each rectifier element is formed by a three-layer diode. A three-layer diode, as is well known, is formed by a p–np semiconductor sequence of coatings with cathode short circuit, and represents a series connection of two p–n junctions. A three-layer diode on its own, as is well known, has an I–U characteristic curve of form b in FIG. 4, and therefore additional circuitry having parallel connected high-blocking capability diodes is superfluous. In the case of a three-layer diode U4 is typically about 15 volt. In this modified specific embodiment, therefore, in total only six more semiconductor chips are needed for the high-voltage vehicle electrical system.

Figure 5:
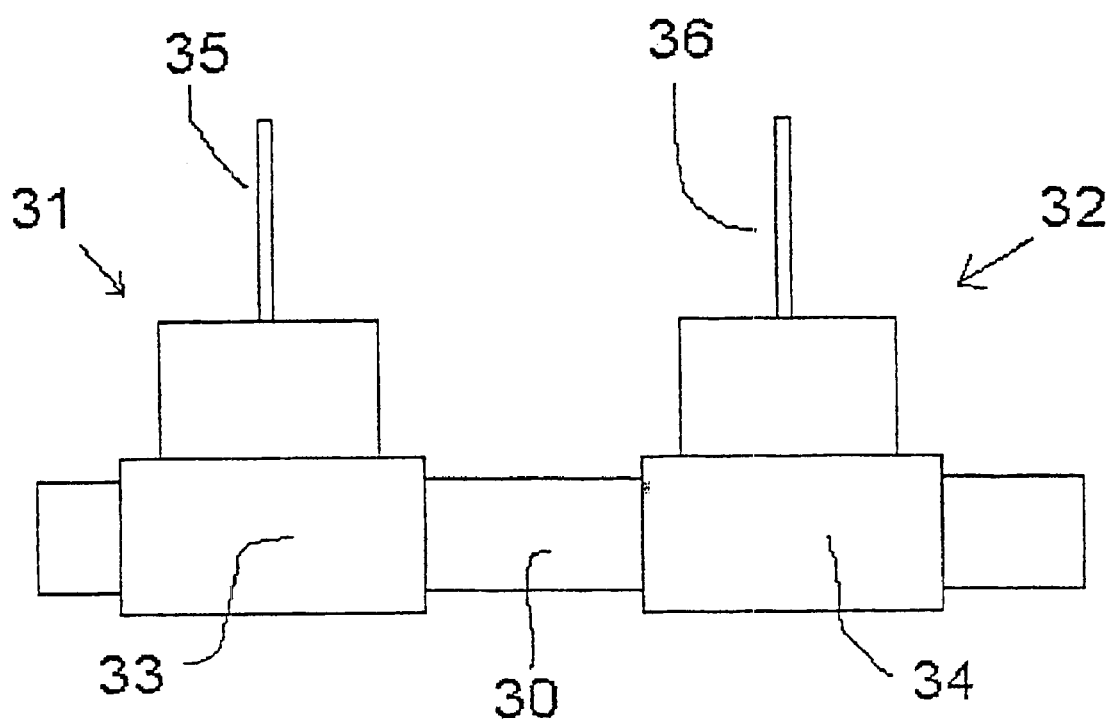
FIG. 5 shows a further exemplary embodiment.

In a side view, FIG. 5 shows the mechanical construction of a diode pair 11, 12, 13, 14, 15 or 16. Each single diode of a diode pair is designed as a press-fit diode 31 or 32, having a press-fit socket 33 or 34, respectively. The semiconductor chip is positioned on the inside of the illustrated diode housing (not shown), and can be contacted from the outside via head wire 35 or 36 and press-fit socket 33 or 34, respectively. The two press-fit sockets are connected in an electrically conducting way via aluminum cooling strip 30 into which the press-fit sockets are pressed in, into two openings adapted to the press-fit sockets.

For the implementation of a series connection of the single diodes, the semiconductor chips in the press-fit diodes 31 and 32 are arranged with exchanged surface orientations, so that the cathode of one diode is electrically connected to the anode of the other diode via the cooling strip. According to FIG. 2, the head wires are connected electrically to the three-phase current terminals or the poles (ground terminal or B+) of the vehicle electrical system (not shown in FIG. 5). The complete rectifier as in FIG. 2 is thus composed of six equal cooling strip arrangements according to FIG. 5, the six cooling strips, for example, being fixed on a connecting plate made of plastic, and the connections among the cooling strip arrangements being sprayed into the plastic.

The cooling strip arrangement according to FIG. 5 can also be used to produce a rectifying element 20, 21 or 22 according to FIG. 3, in that a semiconductor chip having a four-layer diode is positioned into press-fit diode 31, and a semiconductor chip having a high-blocking capability diode is positioned into press-fit diode 32. The anode of the diode is electrically connected, for example, with the cathode of the four-layer diode via the cooling strip, and the opposite electrodes then have to be contacted with one another via the head wires and connected to the respective three-phase current phase (not shown in FIG. 5).

Alternatively to FIG. 5, the mechanical construction of a diode pair 11 through 16 can also be done by doing without a cooling strip 30, in that a series connection of two semiconductor chips is positioned inside a single diode housing of a press-fit diode. That makes it possible to position the diode pairs produced in the form of a single press-fit diode each into the already known rectifier cooling strip arrangements, by simply replacing the press-fit diodes having a single semiconductor chip by the new press-fit diodes. In this connection, the current path through the new press-fit diodes runs from the press-fit socket via a solder area which connects the first diode chip to the second diode chip positioned over it, to the second diode chip and from there to the head wire via a further solder area. This configuration, as in the known arrangement, can be soldered to only one diode chip in a customary soldering furnace.

What is claimed is:

1. A three-phase bridge rectifier system, comprising:

three rectifier paths, each rectifier path including two of a plurality of rectifier elements, the two rectifier elements in each of the three rectifier paths being arranged in series; and three leads of a three-phase current terminal, wherein:

at a location in each rectifier path that is between the respective two rectifier elements thereof, each rectifier path is connectible to one of the three leads, three cathode terminals of the plurality of rectifier elements lying opposite the three-phase current terminal are connected to a positive pole, three anode terminals of the plurality of rectifier elements lying opposite the three-phase current terminal are connected to a negative pole, at least three of the plurality of rectifier elements are formed by two-pole semiconductor rectifiers including at least two series-connected p–n junctions, and one of those of the two-pole semiconductor rectifiers connected to the positive pole and those of the two-pole semiconductor rectifiers connected to the negative pole are formed by two semiconductor diodes connected in series and designed as Zener-diodes.

2. The rectifier system according to claim 1, wherein:

the two-pole semiconductor rectifiers connected to the negative pole are each formed by an antiparallel connection of a four-layer diode to a high-blocking capability diode.

3. The rectifier system according to claim 1, wherein:

the two-pole semiconductor rectifiers connected to the negative pole are each formed by a three-layer diode.

4. The rectifier system according to claim 1, wherein:

the two semiconductor diodes are each made of two semiconductor chips, the semiconductor chips being soldered one on top of the other and being arranged in a common diode housing.

\* \* \* \* \*

UNITED STATES PATENT AND TRADEMARK OFFICE
CERTIFICATE OF CORRECTION

PATENT NO. : 6,538,910 B1 Page 1 of 1
DATED : March 25, 2003
INVENTOR(S) : Weiberle et al.

It is certified that error appears in the above-identified patent and that said Letters Patent is hereby corrected as shown below:

<u>Column 1,</u>
Delete lines 5 - 34.

Signed and Sealed this

Fourteenth Day of December, 2004

JON W. DUDAS
*Director of the United States Patent and Trademark Office*